May 7, 1963   W. W. FIELD   3,088,544
CUSTOMER LOADING CONVEYOR
Filed July 12, 1960   3 Sheets-Sheet 1
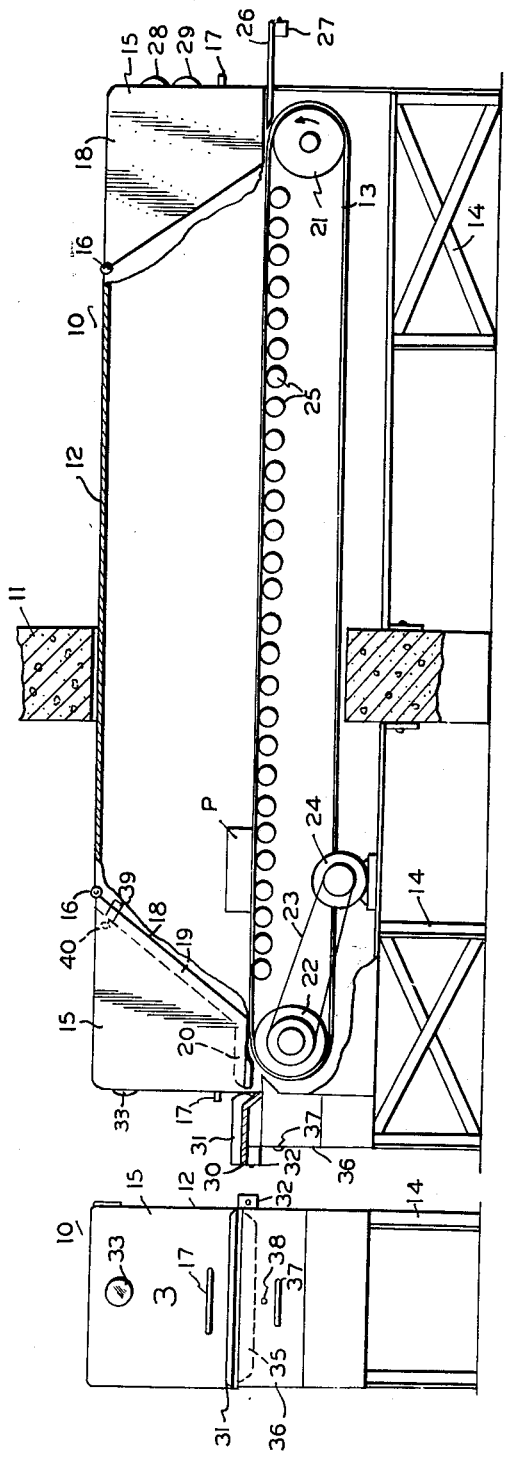
INVENTOR
WESLEY W. FIELD
ATTORNEYS May 7, 1963  W. W. FIELD  3,088,544
CUSTOMER LOADING CONVEYOR
Filed July 12, 1960  3 Sheets-Sheet 2

INVENTOR
WESLEY W. FIELD
BY *Green, McAllister & Miller*
ATTORNEYS

May 7, 1963  W. W. FIELD  3,088,544
CUSTOMER LOADING CONVEYOR
Filed July 12, 1960  3 Sheets-Sheet 3

INVENTOR
WESLEY W. FIELD

BY *Green, McCallister & Miller*

ATTORNEYS

United States Patent Office 3,088,544
Patented May 7, 1963

3,088,544
CUSTOMER LOADING CONVEYOR
Wesley W. Field, R.D. 1, Dehaven Road, Beaver Falls, Pa.
Filed July 12, 1960, Ser. No. 42,353
14 Claims. (Cl. 186—1)

This invention relates to a conveyor assembly for transporting articles to a convenient vehicle-loading station, and more particularly to an enclosed endless conveyor for delivering customers' purchases from an inspection or check-out station within a store to an automobile loading port adjacent the exterior of the store.

With the recent innovation of the self-service store, it has been customary to provide customers with push carts or baskets upon entering the store, so that they may conveniently select and carry their purchases. After a customer has completed selecting his purchases, the cart or basket is brought to a central inspection or check-out station where the customer pays for his purchases. The purchases are then usually packed in boxes or bags for the customer to carry with him upon leaving the store. Some self-service stores, particularly food markets, allow the customers to use the carts to transport their purchases to their automobiles. However, due to the reluctancy of the customers to return the carts to the store, many carts have become misplaced or damaged by being left out-of-doors. Accordingly, an increasing number of the self-service stores do not now allow the customers to remove the carts from the store premises, thus burdening the customers with the problem of transporting a plurality of cumbersome packages to their automobiles.

A further problem is encountered when utilizing push carts to remove a customer's purchases from a store, particularly during the inclement winter weather which is prevalent in the northern sections of the country. Through the necessity of convenience in removing a customer's purchases from a store, the check-out stations are located close to or in front of exit doors, usually of the swinging type. When a customer pushes his cart outwardly through the swinging door, the check-out clerks, manning the inspection station, are exposed to severe drafts and cold weather which enter the store through the opened door. Not only is this condition a serious hazard to the health of the check-out clerks, but also subjects them to almost unbearable working conditions. By utilizing my invention of conveying customers' purchases outwardly of the store, the usual swinging doors which are now required to permit the passage of push carts therethrough may be replaced with the conventional revolving door which substantially reduces or eliminates the entrance of drafts and inclement weather in the vicinity of the check-out clerks.

To alleviate these problems, I have devised a customer loading conveyor, having an endless conveyor belt within a closed conveyor chute, which extends from the check-out station of a store to an automobile loading port adjacent the store. After the customer has paid for his purchases and they are packaged in the usual bags or boxes, the clerk places the customer's purchases within an inlet end of the conveyor chute, and gives the customer a card-key bearing the number of the conveyor utilized, it being understood that a plurality of such conveyors would be positioned adjacent the check-out station of the store. The customer then drives his automobile to the loading port adjacent the exterior of the store, and utilizes his card-key to unlock the outlet end of the conveyor, so that he may obtain his purchases and conveniently load them within his automobile.

It thus has been an object of my invention to alleviate the problems heretofore presented in transporting a customer's purchases from a check-out station within a store to the customer's automobile;

A further object of my invention has been to provide a simple, safe and expedient conveyor assembly for transporting goods from an inspection station adjacent the loading end of the conveyor to a convenient pick-up station adjacent the unloading end of the conveyor;

A further object of my invention has been to provide a conveyor belt within an enclosing chute having enlarged canopy-type doors adjacent each end thereof for facilitating easy access to the belt;

An additional object of my invention has been to provide an endless conveyor within an enclosing chute wherein the chute is provided with means for locking a door on the outlet end thereof to prevent unauthorized persons from operating the conveyor and from opening the chute and obtaining articles therefrom;

A still further object of my invention has been to provide an endless conveyor within an enclosing chute having means for automatically energizing the conveyor upon the opening of an outlet end of the chute, and having means for automatically de-energizing the conveyor when an article placed thereon reaches a pre-determined position adjacent the outlet end thereof;

These and other objects of my invention will be apparent to those skilled in the art from the following disclosure and accompanying drawings in which:

FIGURE 1 is a side elevational view, partially in section, of a conveyor assembly embodying my invention;

FIGURE 2 is an end elevational view of the outlet or left-hand end of the conveyor assembly shown in FIGURE 1;

Figure 3:
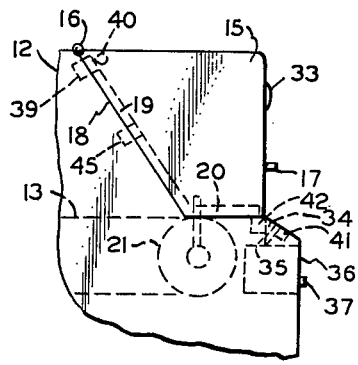
FIGURE 3 is a fragmental side elevational view of another embodiment of my invention.

Referring now to the drawings and particularly FIGURES 1 and 2, a conveyor assembly 10 is shown positioned through a wall or partition 11. The conveyor assembly comprises a closed chute or conveyor housing 12, an endless conveyor 13 positioned within the chute, such as a belt conveyor, and support frames 14. The chute 12 is provided with a canopy door 15 at each end thereof which permits an easy access to the ends of the conveyor belt 13. The doors 15 are swingably connected to an upper portion of the chute 12 by means of friction or ratchet type hinges 16. When the doors are raised, the hinges 16 retain the doors 15 in an open position. If desired, regular hinges may be utilized in place of the friction hinges 16, and the doors may be provided with an automobile trunk type of folding bracket for retaining the doors in a raised or opened position. Each of the doors 15 is provided with a handle 17 for facilitating the raising and lowering of the doors. A downward pull on the handles 17 will override the ratchet or frictional effect of the hinges 16, so that the doors may be conveniently closed.

Figure 6:
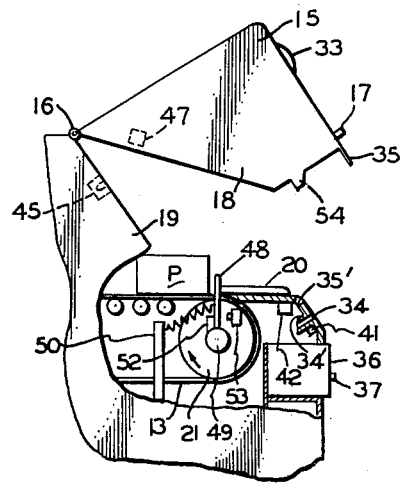
FIGURE 6 is a fragmental side elevational view of the embodiment of FIGURE 3 of my invention illustrating an alternate automatic control system which may be utilized with my conveyor assembly.

As noted particularly in FIGURES 1, 3 and 6, the doors 15 have sidewall portions 18 which overlie sidewall portions 19 of the chute 12 to prevent the entrance of the elements within the chute. The lower ends of the sidewall portions 19 extend along the edge of the belt 13 and provide a pair of guide rails 20 for guiding a package or parcel P as it emanates from the outlet end of the chute. The conveyor belt 13 is positioned over an idler roller 21 at the inlet end of the chute and over a drive roller 22 at the outlet end. The drive roller 22 is connected to a drive motor 24 by any suitable means such as a belt or chain 23. A plurality of support rollers 25 may be positioned under the top portion of the belt 13 to prevent the belt from sagging and to provide a smooth path for the packages P.

A loading shelf 26 having a curved inner end which complements the curvature of the idler roller 21, extends outwardly from the inlet or loading end of the conveyor for receiving articles to be placed therewithin. A push button-operated start switch 27 is conveniently located adjacent the loading platform 26 for energizing the conveyor belt drive motor 24. A red indicating light 28 and a green indicating light 29 are positioned adjacent the inlet end of the conveyor to indicate whether or not the conveyor is in use. Since a plurality of conveyor assemblies 10 will be positioned between a check-out station and a car port or automobile loading station, the indicating lights function to inform a clerk at the check-out station which of the conveyors are available for use.

An unloading platform 30 is provided adjacent the outlet end of the conveyor, and as shown in FIGURE 1, it may project outwardly of the chute 12. The unloading platform 30 is shown as being provided with a safety guide rail 31, which extends along the sides and across the end of the platform to prevent packages emanating from the outlet end of the conveyor from falling off the platform. A start switch 32 may be provided adjacent the unloading platform 30 to energize the belt drive motor 24 and move packages along the conveyor. However, if desired, the start switch may be positioned within the chute 12, adjacent the unloading end, so that unauthorized persons may not tamper with the outlet end start switch.

When the start switch 32 is positioned on the outside of the conveyor chute 12, an automatic cut-off switch 39 (see also FIGURE 8), actuated to an open position by the closing of the outlet canopy door 15, is positioned within the conveyor 12 adjacent the roof. When the outlet canopy door 15 is closed, the circuit to switch 32 is opened, thus preventing unauthorized persons from energizing the conveyor motor 24 through the outlet switch. The control switch 39 has an upwardly tensioned roller arm 40 which projects against an upper surface of the outlet canopy door 15, and when the door is closed, the roller arm 40 is urged downwardly to maintain the switch 39 in an open position. However, when the outlet canopy door 15 is opened, the roller arm 40 moves to its resiliently urged upward position, thus closing the switch 39 to the circuit of start switch 32 so that drive motor 24 may be energized and conveyor 13 actuated.

As shown particularly in FIGURES 1, 3 and 6, the outlet canopy door 15 is provided with a suitable locking device to prevent unauthorized persons from opening the conveyor chute and removing articles therefrom. Although an ordinary lock and key arrangement could be utilized to lock the outlet canopy door 15, such a standard key is likely to become intermingled with a customer's personal keys and be misplaced or lost.

Figure 4:
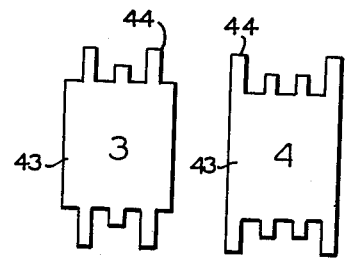
FIGURE 4 illustrates typical card-keys which may be utilized with my invention.

Accordingly, I have devised a simple and easily operable unlocking arrangement for my customer conveyors. A plurality of card-keys 43 are utilized which have various end projections or fingers 44 designed to unlock the various conveyor chutes. Each chute 12 has a number on the outlet end thereof, such as shown in FIGURE 2, and as shown in FIGURE 4, each card has a number corresponding to a chute to be utilized. When a customer is ready to load his purchases in his automobile, he may readily match the number on his card-key with that on a conveyor and easily locate the conveyor chute containing his purchases. The fingers 44 on each numbered card-key are designed to only unlock the outlet canopy door on the chute which bears the same number as the card-key.

Each of the outlet canopy doors 15 has a projection 35 which extends downwardly below the unloading platform 30. In the embodiment shown in FIGURES 1 and 2, projection 35 extends downwardly through an opening formed within the unloading platform. However, in the embodiment shown in FIGURES 3 and 6, wherein the unloading platform 30 does not project outwardly of the chute 12 but terminates adjacent the inner back edge of the outlet canopy door 15, the projection 35 extends downwardly through an opening 35' formed in the conveyor housing. A card-key receiving slot 34, having guide flanges 34', extends diagonally downwardly either through the unloading platform 30 of the embodiment shown in FIGURES 1 and 2, or through an inclined portion of the conveyor housing, as shown in the embodiments of FIGURES 3 and 6. The slot 34 terminates adjacent the projection 35.

As shown in FIGURES 3 and 6, a toggle switch 41 may be positioned adjacent the slot 34. The switch 41 has activating fingers positioned within the slot, which are actuated only by the card-key designated for that particular conveyor assembly. A door latch having an operating relay 42 is positioned adjacent and cooperable with the projection 35 for locking the outlet canopy door 15 in its closed position. The switch 41 is activated by the insertion of the appropriate card-key 43 in the slot 34 to energize the relay door latch 42 and unlock the outlet canopy door 15. The door 15 may then be raised to an open position which removes the projection 35 from across the end of slot 34. The card key 43 is then free to fall downwardly through the end of slot 34 and into a key-receiving drawer 36 positioned therebelow. Each conveyor drawer may be opened by a handle 37 to replenish the check-out clerks' supply of card-keys. A standard lock 38 prevents others from removing the card-keys from the drawer.

If desired, the toggle switch 41 may be replaced with a mechanical trip lock which is actuated by the insertion of a card-key 43. When the trip lock is utilized in place of the toggle switch, the door latch relay 42 is unnecessary. The insertion of a card-key 43 within the slot 34 trips and unlatches the mechanical lock, thus permitting the door 15 to be raised. The raising of the outlet canopy door 15 allows the card-key 43 to fall into the drawer 36. When the door 15 is closed, the mechanical lock again relatches and locks the door in a closed position. If desired, an electric eye system, actuated by the selective passage of light through the various card-keys, may be utilized to unlock the outlet canopy doors 15.

Figure 7:
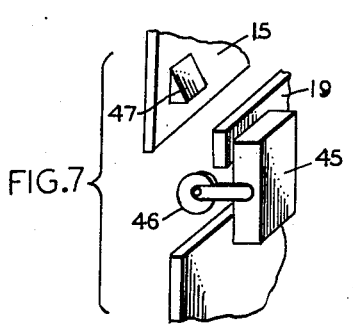
FIGURE 7 is an enlarged detailed fragmental view in elevation illustrating the positioning of a control switch and operating pawl which may be utilized within my invention.

A trip switch 45, having a roller arm 46, is secured to the conveyor chute 12, adjacent the sidewall portions 19, which are overlapped by the sidewalls 18 of the outlet canopy door 15. As shown particularly in FIGURES 6 and 7, a pawl 47 is secured to a sidewall 18 of the outlet door 15 and is adapted to contact the roller arm 46 when the door 15 is closed. The switch 45 is a unidirectional momentary contact spring return switch which is activated by the pawl 47 as the outlet door 15 is moved downwardly toward its closed position. However, when the door 15 is raised, the pawl merely swings the roller arm upwardly, but such upward movement does not activate the switch, and the spring return urges the roller arm 46 back to its central position.

Figure 5:
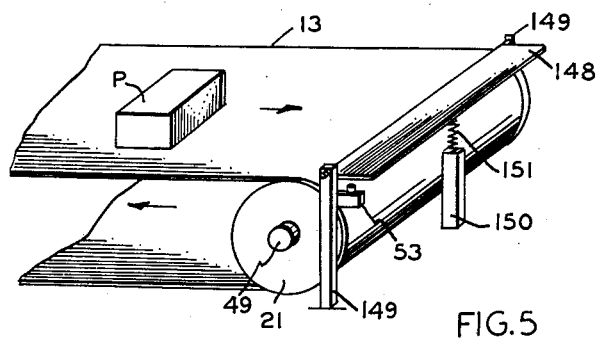
FIGURE 5 is a fragmental perspective view of an automatic control system which may be utilized with my conveyor assembly.

An embodiment of an automatic control device which may be utilized with my conveyor assembly is illustrated in FIGURE 5. As shown, the outlet end of the conveyor may be provided with a pressure plate 148 which is pivotally secured to frame members 149 of the conveyor assembly. The plate 148 is positioned immediately above the unloading platform 30. A spring 151 is secured between an under surface of the plate 148 and a frame member 150 of the conveyor assembly to maintain the plate in a normal unloaded pre-determined horizontal position. The plate 148 is mounted to permit pivotal movement downwardly against the resiliency of the spring 151. A normally closed limit switch 53, connected in series with the motor 24, is secured to a frame member 149 adjacent an under surface of the pressure plate 148 and is adapted to be contacted by the plate and urged into an open position when the plate is pivoted downwardly by the pressure of a package P conveyed thereon by the conveyor 13.

As shown in the embodiment of FIGURE 6, the outlet end of the conveyor may be provided with an automatic control device comprising a treadle bar 48 positioned across the upper surface of the conveyor belt 13 and pivotally connected to an axle 49 of the idler roller 21. The treadle bar 48 is mounted to permit pivotal movement toward the outer end of the conveyor, against the resiliency of a holding spring 51 secured to a frame member 50. A stop member 52 limits the backward pivotal movement of the treadle bar 48. The normally closed limit switch 53, connected in series with motor 24, is then positioned adjacent a side member of the treadle bar 48 and is adapted to be contacted thereby and urged into an open position when the treadle bar 48 is pivoted outwardly.

Figure 9:
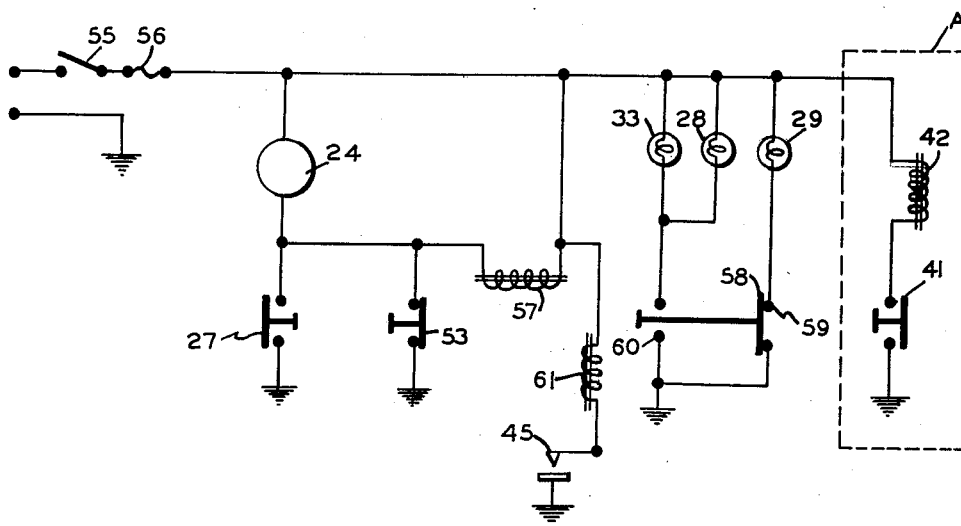

As a package P is moved along the conveyor 13 utilizing control plate 148 or treadle bar 48, it will contact the treadle bar 48 or plate 148, pivoting it into abutment with the limit switch 53, thereby opening the limit switch and de-energizing the conveyor motor 24 (see also FIGURE 9). A cam 54 is formed along the lower edge of the outlet canopy door 15, and is positioned to contact the treadle bar 48 or plate 148 when the outlet door is lowered. As the door moves downwardly, the cam 54 pivots the treadle bar 48 or plate 148 into abutment with the limit switch 53, to open the limit switch and thereby de-energize the conveyor motor 24 when the outlet door 15 is in its closed position.

Figure 8:
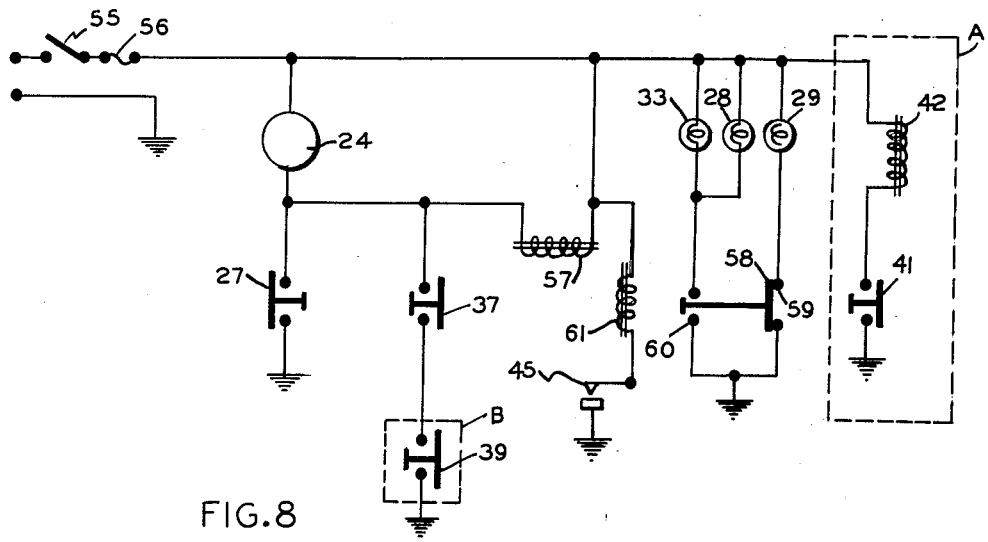
FIGURE 8 is a schematic wiring diagram of an electrical circuit which may be utilized to provide a manual operation of my conveyor system; and, FIGURE 9 is a schematic wiring diagram of an electrical system which may be utilized with my conveyor assembly to provide an automatic operation.

A wiring diagram for the manual controlled conveyor assembly, such as shown in FIGURES 1 and 2, is disclosed in FIGURE 8. The inlet line is provided with a main line switch 55 and an overload device such as a fuse 56. When the main line switch 55 is closed, the green indicating light 29 at the inlet or loading end of the conveyor will be illuminated. A lit green light 29 indicates to a clerk at the check-out station that the conveyor assembly is not presently in use and is available to receive a customer's purchases. The check-out clerk therefore selects a conveyor having a lit green indicating light and places the customer's purchases within the inlet end of the conveyor chute. The clerk then presses the normally open start button 27 to move the customer's purchases a short distance along the conveyor 13.

When the start button 27 is pressed, it also energizes a latch relay 57 to latch light switch 58 in contact with red light terminals 60. The switch 58 has a normally closed position on the green light contacts 59; however, when the relay 57 is energized, the green light 29 is de-energized and the red indicating lights 28 and 33 at the opposite ends of the conveyor are energized to indicate that the conveyor is in use.

The customer is given a card-key bearing the number of the conveyor utilized, and after he has had an opportunity to bring his automobile up to the unloading end of the conveyor, he inserts his card-key within the slot 34 to unlock the outlet canopy door 15. If a mechanical trip lock is utilized, the fingers 44 on the card-key unlatch the outlet door 15 and switch 41 and relay 42, appearing in bracket A of FIGURE 8, would not be incorporated within the wiring system.

If an electrical solenoid lock is utilized, however, the insertion of the card-key 43 within the slot 34 will close switch 41, thereby activating the door latch relay 42 to unlock the outlet canopy door 15. When the canopy door 15 is raised, the card 43 is allowed to fall downwardly into a receiving drawer 36, thereby releasing the switch 41 and de-energizing the latch relay 42, so that when the door is returned to its closed position, it will again be relatched.

The customer then presses the start button 37 to move his purchases along the conveyor and toward the unloading end. If the switch 37 is positioned within the conveyor, so that unauthorized persons may not tamper with the switch and energize the conveyor, the safety control switch 39 appearing in bracket B of FIGURE 8 would not be incorporated within the circuit.

However, if the start switch 37 is positioned outside of the conveyor chute, such as shown in FIGURES 1 and 2, the normally closed control switch 39 is incorporated within the circuit as a control or safety device. When the outlet canopy door 15 is in its closed position, a roof portion of the canopy door urges the roller arm 40 downwardly to open the switch 39. However, when the canopy door is raised to its open position, the spring tensioned roller 40 is resiliently urged to its outward position, allowing the switch 39 to close, thereby completing the circuit to permit the start switch 37 to energize the conveyor motor 24.

After the customer has unloaded his purchases from the conveyor, he then pulls the outlet canopy door 15 downwardly against the friction or ratchet force of the hinge 16 to close and lock the outlet door. As the door moves downwardly, the pawl 47 contacts the roller arm 46 of the unidirectional momentary spring return switch 45 to close the switch and energize a release relay 61 which unlatches the latch relay 57. The light switch 58 then returns to its normally closed position on the contacts 59 of the green light 29. As the release relay 61 is energized, therefore, the red indicating lights 28 and 33 are de-energized and the green indicating light 29 is again energized to indicate to the check-out clerk that the conveyor is again available to receive another customer's purchases. Also, the de-energization of the red light 33 on the outlet canopy door 15 indicates to the customer that the outlet door has been lowered to its closed and locked position. The latch automatically locks the door when it is closed.

In the embodiment shown in FIGURES 1 and 2, the packages P emanating from the outlet end of the conveyor are received upon an unloading platform 30 having a guide rail 31 positioned thereabout. As shown in FIGURES 3 and 6, the unloading platform 30 does not extend outwardly beyond the backward extent of the canopy door, and accordingly, the lower guide rail 20 may be extended completely about the platform to form a safety rail.

FIGURE 9 illustrates a wiring diagram for an automatic operation of the embodiment of my invention shown in FIGURES 5 and 6. The wiring diagram of FIGURE 9 is virtually the same as that disclosed in FIGURE 8 except that the switches 37 and 39 of FIGURE 8 have been eliminated and limit switch 53 has been substituted therefor. Accordingly, the initial energization of the drive motor 24 together with the de-energization of the green indicating light 29 and the energization of the red indicating lights 28 and 33 are similar to that disclosed in FIGURE 8. Likewise, the unlocking mechanism may be either mechanical or electrical, similar to that disclosed in FIGURE 8.

However, in place of the control switch 39 and the manually-operated start switch 37 utilized in the electrical circuit of FIGURE 8, the circuit disclosed in FIGURE 9 utilizes a normally closed pressure-operated start switch 53, which functions to automatically control the movement of packages on the conveyor belt 13 when the outlet canopy door 15 is opened. As previously mentioned, the cam 54 on the lower end of the outlet canopy door, cams either the treadle 48 or plate 148 into contact with the switch 53, thereby opening the switch when the outlet door 15 is closed. When the outlet door 15 is opened, the bar or plate is again urged in its upright position by means of the spring 51 or 151, which allows the switch 53 to close, thereby energizing the drive motor 24 and activating the conveyor 13. As a package P on conveyor 13 engages the treadle bar 48 or plate 148, it moves such member into contact with the switch 53, and opens the switch to de-energize the motor 24 and stop the conveyor 13. As each package is removed from the conveyor, the next package is moved forward into contact with the treadle bar or pressure plate until all the packages are removed.

When the customer closes the outlet door 15, the pawl 47 contacts the roller arm 46 of switch 45, thereby energizing release relay 61 to release the latched switch 58. The red indicating lights 28 and 33 are accordingly de-energized and the green indicating light 29 is energized in the same manner as in the circuit of FIGURE 8. Also, during the downward movement of the outlet door 15, the cam 54 contacts the treadle bar 48 or pressure plate 148 and cams it into an abutting relation with the switch 53, to open the switch and de-energize the conveyor motor 24, thereby stopping the conveyor 13. When the outlet canopy door 15 is closed, it will be latched in a locked position and require the use of the correct card-key to unlock it, thereby preventing access by unauthorized persons.

Although I have disclosed and described my now preferred embodiments of this invention, it will be apparent to those skilled in the art that various changes and modifications may be made hereto without departing from the spirit and scope of the invention as defined in the appended claims.

I claim:

1. A conveyor assembly for transporting articles of purchase and the like from an inspection station within an enclosure through a partition to a customer loading station exteriorly of the enclosure comprising, a closed chute having open end portions, swingable closure means for closing at least one of said end portions, an endless conveyor operatively positioned within said chute, means for driving said endless conveyor, manually operable means adjacent said one end of said conveyor for energizing said drive means, means for retaining said swingable closure means in an open position, means for releasably-locking said closure means in a closed position, and means adjacent said one end portion for preventing the energization of said drive means by said manually-operable means when said closure means is in a closed position.

2. A conveyor assembly for safely transporting successively presented individual groups of articles of purchase and the like from an inspection station within a building through a partition to a customer loading station, wherein only an authorized person may receive each individual group of articles from the conveyor at the customer loading station comprising, a closed conveyor chute having open receiving and delivering end portions, closure means for movement into and out of a closing-off position over said open delivery end portion, an endless conveyor operatively-positioned within said conveyor chute, a motor for driving said endless conveyor, means for energizing said drive motor to move a group of articles from the open receiving end portion to the open delivering end portion, latch means for locking said closure means when it is moved into a closing-off position over said open delivery end portion, a closed container for receiving key cards therein, a slot portion open from its outer end to said latch means and open from said latch means to said container, said latch means being successively-releasable upon the manual insertion within said slot portion of successive key cards into a cooperating relation therewith, and said container being positioned to receive key cards therein from said slot portion after they have successively been released by said latch means.

3. An enclosed conveyor assembly for transporting articles of purchase from a check-out station within a section of a building to an automobile loading station exteriorly thereof, comprising an endless belt positioned within an enclosing conveyor chute, said chute having an open inlet end portion and an open outlet end portion, an inlet door member positionable over said open inlet end portion and an outlet door member positionable over said outlet end portion to close-off said conveyor chute, said door members being movable between a raised-open and a lowered-closed position, hinge means for retaining said door members in a raised-open position, a drive motor for driving said endless conveyor, switch means adjacent each end of said conveyor for energizing said drive motor, and means adjacent the outlet end of said conveyor for prohibiting the energization of said drive motor by the outlet end switch means when the outlet door member is closed.

4. A customer loading conveyor for transporting articles of purchase from a check-out station within the confines of a building through a partition to a loading station such as an automobile loading port comprising, a closed chute having an open inlet and an outlet end portion adjacent the check-out station and loading station respectively, a door member secured to said chute adjacent at least one open end portion, an endless conveyor positioned within said chute, a loading platform adjacent the inlet end and an unloading platform adjacent the outlet end of said chute contiguous with and complementing said endless conveyor, means for driving said endless conveyor, indicating means positioned adjacent the inlet and outlet ends of said chute for indicating when said conveyor assembly is in use, manually operable means adjacent the inlet end of said chute for simultaneously energizing said drive motor and for activating said indicating means, and means adjacent the outlet end of said conveyor assembly operable only when a door member at the outlet end is in an open position to energize said drive motor and actuate said endless conveyor.

5. A conveyor assembly for transporting articles of purchase from an inspection station within an enclosure through a partition to a customer loading station externally thereof comprising, a conveyor chute having inlet and outlet canopy doors swingably secured to the opposite ends thereof, an endless conveyor belt positioned within said chute, motor means for driving said endless conveyor belt, said canopy doors having portions overlying end portions of said conveyor belt to expose such end portions for easy access when said doors are in a raised-open position, means for retaining said canopy doors in a raised-open position, releasable latch means for securing the outlet canopy door in a closed-latched position, an unloading platform positioned adjacent the outlet end of said conveyor assembly complementing said conveyor belt, a slot formed within said unloading platform, a projection on said outlet canopy door extending downwardly through said slot, and a second slot formed in said conveyor assembly and terminating adjacent said downwardly-extending projection for receiving a releasing device to unlock said latching means and permit said outlet door to be raised.

6. A conveyor assembly for transporting articles of purchase from a check-out station or the like from within the confines of a building through a partition to a customer loading station comprising, an endless conveyor positioned within an enclosing chute, said chute having an outlet canopy door swingably secured to an upper portion of the chute adjacent the customer loading station, said canopy door having portions overlying outlet end portions of said conveyor to expose such end portions of said conveyor for easy access when the canopy door is raised, means for retaining said canopy door in an open-raised position, an unloading platform positioned adjacent the outlet end of said conveyor assembly to complement said endless conveyor, a projection on said outlet canopy door, latch means cooperable with said projection for locking said outlet door in a closed position, a slot extending within said conveyor assembly and terminating adjacent said projection, and means projecting within said slot and responsive to the insertion of a selective releasing device therewithin for releasing said latch means to unlock said canopy door.

7. A conveyor assembly for transporting goods such as a customer's purchases from the check-out station within a building such as a store through a partition to an adjacent customer loading port comprising a conveyor chute, an endless conveyor belt positioned within said chute, an inlet canopy door swingably secured to said chute adjacent the check-out station and an outlet canopy door swingably secured to said chute adjacent the customer loading port, means for releasably locking said outlet canopy door in a closed position, an electric motor for driving said endless conveyor, means adjacent the inlet end of said conveyor chute and operable by a check-out clerk for momentarily energizing said electric motor to actuate the endless conveyor and convey the customer's purchases along a portion of said chute, and means positioned adjacent the outlet end of said conveyor assembly and operably accessible only when said outlet canopy door is an open position for energizing said electric motor and actuating said endless conveyor to transport a customer's purchases along the conveyor toward the outlet end.

8. A customer loading conveyor for transporting articles of purchase from an inspection station within a building through a partition to an automobile loading port and the like which comprises, a chute extending through a wall partition, an endless conveyor belt positioned within said chute, inlet and outlet canopy doors swingably secured to said chute adjacent inlet and outlet ends respectively of said chute, said canopy doors having portions overlying end portions of said conveyor belt for easy access thereto when said doors are opened, means for retaining said canopy doors in a raised-open position, a drive motor for driving said endless conveyor belt, means positioned adjacent the inlet end of said conveyor assembly for momentarily energizing said drive motor to actuate said endless conveyor belt and transport a customer's purchases partially along said conveyor assembly, means adjacent the outlet end of said conveyor assembly operable only when said outlet canopy door is in an open position for automatically energizing said drive motor to actuate said conveyor, and said last-mentioned means being actuated by an article conveyed by the endless belt to automatically de-energize the drive motor and de-activate the conveyor belt as such article reaches a pre-determined position adjacent the outlet end of the conveyor.

9. A conveyor assembly for transporting articles of purchase from an inspection station within a building through a wall partition to a customer loading station which comprises, a closed chute having open inlet and outlet end portions extending through a vertical wall member, inlet and outlet door members swingably secured to said inlet and outlet end portions respectively, an endless conveyor belt positioned within said chute, said door members having portions overlying end portions of said belt for providing easy access to the end portions of said belt, drive means for activating said endless conveyor belt, means adjacent the inlet end of said conveyor assembly for momentarily energizing said drive means to actuate said conveyor belt and transport articles of purchase partially along said conveyor, means adjacent the outlet end of said conveyor solely operable when the outlet door is opened to automatically energize said drive means and actuate said endless belt; said last-mentioned means having a pivotally mounted member extending across and adjacent a surface of said conveyor belt, and a normally closed limit switch for energizing said drive means positioned adjacent said pivotally mounted member; and said pivotally mounted member being pivoted by engagement with an article conveyed on said endless belt into abutment with said limit switch to open said switch and de-energize said drive means and de-activate said endless conveyor belt as each successive article conveyed on said belt reaches the exposed outlet end of said conveyor belt.

10. A conveyor assembly for transporting articles of purchase from a check-out station through a vertical partition to an automobile loading port or the like comprising a chute extending through a vertical wall, inlet and outlet doors swingably secured to inlet and outlet ends respectively of said chute, an endless conveyor belt positioned within said chute and extending longitudinally therealong, drive motor means for driving said endless belt, means adjacent the outlet end of said chute for energizing said drive means solely when said outlet door member is in an open position; said last-mentioned means having a treadle bar pivotally mounted over an upper surface of said endless conveyor belt adjacent the outlet end of said chute, a normally closed limit switch for energizing said drive motor means positioned adjacent an upwardly-extending side portion of said treadle bar, resilient means connected to said bar for urging the upwardly-extending portion of said treadle bar to a vertical position, said treadle bar being pivoted against the tension of said resilient means into abutment with said limit switch when contacted by an article conveyed on said endless belt to open said limit switch and de-energize the drive means and de-activate said conveyor, and said outlet door member having a cam portion projecting therefrom to contact said treadle bar when the outlet door is closed and pivot the treadle bar against the limit switch to automatically de-energize the drive means.

11. A conveyor assembly for transporting articles of purchase from a check-out station within a store through a partition to a customer loading station such as an automobile port adjacent the exterior of the store comprising, a chute extending through a vertical wall partition, a canopy inlet door swingably secured to an inlet end of said chute adjacent the checkout station, an outlet canopy door swingably secured to an outlet end of said chute adjacent the customer loading station, an endless conveyor belt positioned within said chute and extending from said inlet to said outlet end, drive means for actuating said endless conveyor belt, means adjacent the inlet end of said conveyor chute for energizing said drive means, means adjacent the outlet end of said conveyor operable when said outlet canopy door is in an open position to energize said drive means and actuate said conveyor belt, means for releasably locking said outlet canopy door in a closed position; said last-mentioned means comprising a downwardly-extending projection on said outlet canopy door, a downwardly-diagonally-extending card-key-receiving slot formed within said chute and terminating adjacent said projection, means positioned beneath said slot for receiving card-keys, latching means positioned adjacent said projection and operable by the insertion of a selective card-key within said slot to unlock said outlet canopy door, said projection being removable from the end of said slot upon the opening of said door thus permitting the card-key to fall downwardly into said receiving means, and said latching means comprising a door latch having an operating relay positioned adjacent and cooperable with said projection for locking said outlet canopy door in its closed position, and a toggle switch positioned adjacent said slot operable by the insertion of a selected card key therewithin to energize said relay and unlatch said door latch so that said outlet canopy door may be opened.

12. A conveyor system for transporting articles of purchase from an inspection station within the confines of a building through a vertical partition wall to a customer unloading station such as an automobile port comprising, a chute extending through an upright partition wall, an inlet door secured to an inlet end of said chute adjacent the inspection station, an outlet door secured to an outlet end of said chute adjacent the customer loading station, an endless conveyor positioned within said chute, drive means for actuating said endless conveyor, indicating means adjacent the inlet and outlet ends of said conveyor for indicating when said conveyor assembly is in use, a normally open switch adjacent the inlet end of said conveyor for simultaneously activating said drive means and said indicating means, means adjacent the outlet end of said conveyor operably accessible only when said outlet door is in an open position for actuating said drive means, a trip switch positioned adjacent and actuated by said outlet door for de-energizing said indicating means when said outlet door is moved to a closed position, a normally open safety switch adjacent said outlet door connected in series with said normally open switch at the outlet end of said conveyor, said safety switch having an arm cooperably engageable with said outlet door for maintaining said safety switch in an open position when said outlet door is in a closed position, and said safety switch being tensioned to a closed position when said outlet door is opened.

13. A conveyor assembly for transporting articles of purchase from an inspection station within a building through a vertical partition wall to a customer loading station, such as an automobile port comprising, a chute extending through a vertical partition wall, an inlet door secured to an inlet end of said chute adjacent the inspection station, an outlet door secured to an outlet end of said chute adjacent the customer loading station, an endless conveyor positioned within said chute, drive means for actuating said conveyor, indicating means adjacent the inlet and outlet ends of said chute for indicating when said chute is in use, a normally open start button positioned adjacent the inlet end of said conveyor for simultaneously energizing said drive means and said indicating means, a normally closed limit switch adjacent the outlet end of said conveyor for energizing said drive means, means for urging said limit switch to an open position to de-energize said drive means when said outlet door is in a closed position, means for urging said limit switch to an open position when an article conveyed on said conveyor belt reaches a pre-determined position adjacent the outlet end of said chute, and a trip switch adjacent said outlet door and actuated by the closing of said door for de-energizing said indicating means.

14. A conveyor assembly for transporting articles of purchase from an inspection station within a building through a vertical partition wall to a customer loading station, such as an automobile port comprising, a chute extending through a vertical partition wall, an inlet door secured to an inlet end of said chute adjacent the inspection station, an outlet door secured to an outlet end of said chute adjacent the customer loading station, an endless conveyor positioned within said chute, drive means for actuating said conveyor, means indicating when said conveyor is in use, normally energized means for indicating when said conveyor is empty, a latch relay for de-energizing said normally energized indicating means and energizing said in use indicating means, a normally open start button positioned adjacent the inlet end of said conveyor for simultaneously energizing said drive means and energizing said latch relay to de-energize said normally energized indicating means and to energize said in use indicating means; means adjacent the outlet end of said conveyor operably accessible only when the outlet door is opened for energizing said drive means, and a trip switch positioned adjacent to and operable by said outlet door as it is closed to de-energize said latch relay and said in use indicating means and to re-energize said normally energized indicating means.

References Cited in the file of this patent

UNITED STATES PATENTS

| | | |
|---|---|---|
| 1,681,859 | Jones | Aug. 21, 1928 |
| 2,044,391 | Lindsay | June 16, 1936 |
| 2,096,959 | Clerc | Oct. 26, 1937 |
| 2,925,886 | Grondona | Feb. 23, 1960 |